(No Model.)

B. P. STEDMAN.
GATE.

No. 585,240. Patented June 29, 1897.

Witnesses:

Inventor.
Burton Philip Stedman

UNITED STATES PATENT OFFICE.

BURTON PHILIP STEDMAN, OF LAMONI, IOWA.

GATE.

SPECIFICATION forming part of Letters Patent No. 585,240, dated June 29, 1897.

Application filed March 13, 1896. Serial No. 583,142. (No model.)

*To all whom it may concern:*

Be it known that I, BURTON PHILIP STEDMAN, a citizen of the United States of America, and a resident of Lamoni, in the county of Decatur and State of Iowa, have invented a new and useful Improvement in Farm-Gates, of which the following is a specification.

The object of my improvement is to construct a cheap, simple, and durable gate that can be raised to any height desired to enable one to swing it over banks of snow and other obstructions, also to separate stock, allowing hogs, sheep, and smaller animals to pass under while completely shutting back larger animals.

My invention consists in the construction and combination of bracing and operating mechanism with the gate, as hereinafter set forth, pointed out in my claim, and illustrated in the accompanying drawings, in which—

Figure 1:
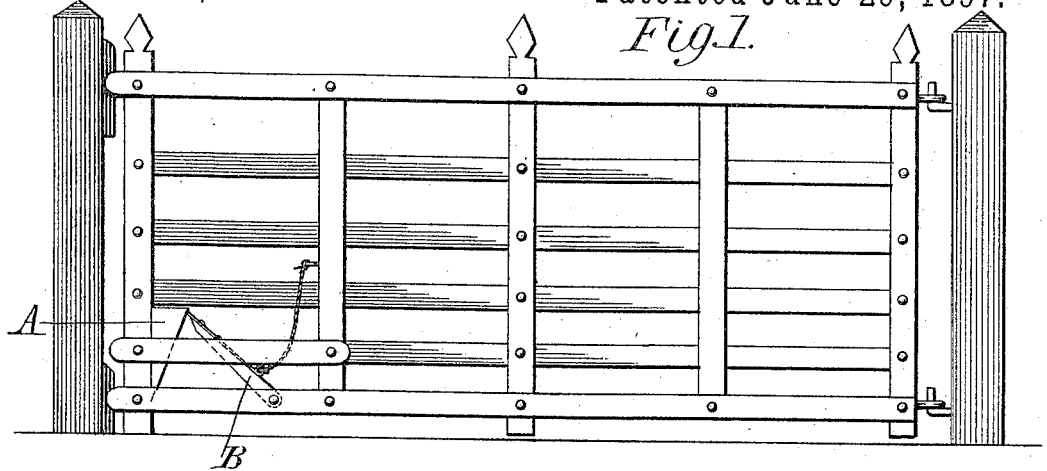
Figure 2:
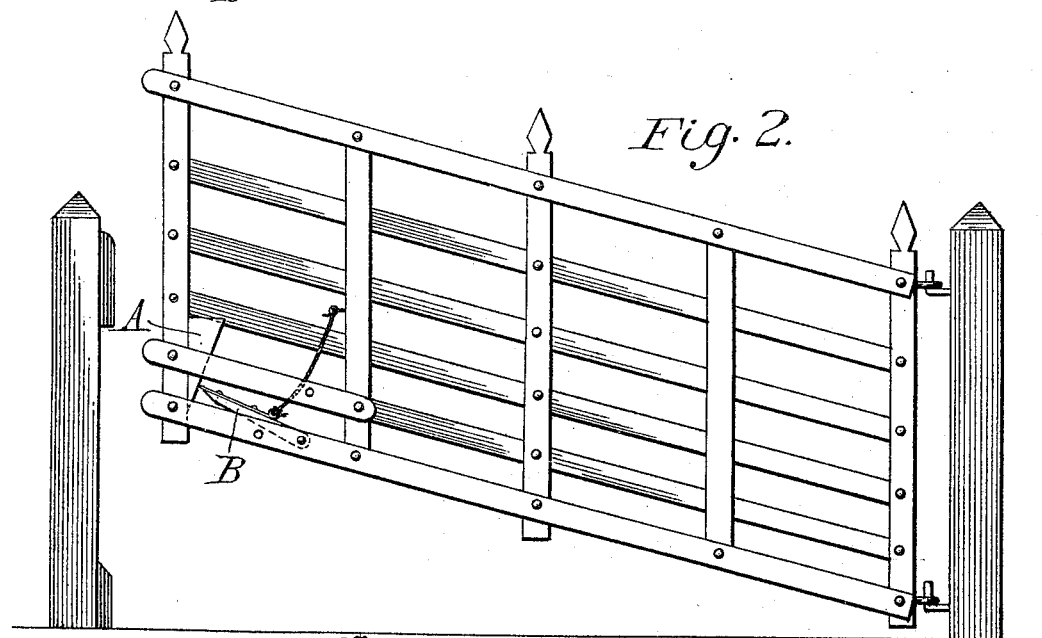
Figure 3:
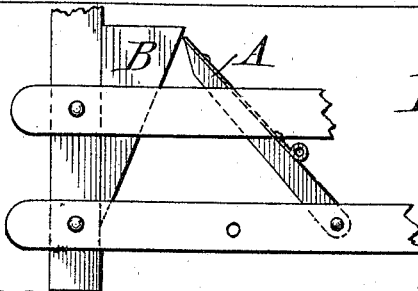

Figure 1 is a side view of the gate in position as required for practical use; Fig. 2, a side view of the gate in a raised position; Fig. 3, an enlarged view of the operating mechanism in its lowest position.

The gate consists of upright and horizontal members pivoted together, and it may be held closed by an ordinary hook.

A is a triangular block of wood or other material fastened on the back edge of the forward upright bar of the gate.

B is a pawl pivoted on the lower bar of the gate in such a position that when the gate is down the free end thereof rests against the upper part of the face of A. B consists of a piece of wood or other material about two feet in length and two inches square in cross-section, beveled on its upper end and iron bound, having a sharp edge.

To elevate the front and free end of gate, I simply lift it, which movement causes the free end of pawl B to drop down along the face of block A and securely hold the gate at any desired height.

To lower the gate, I simply raise it enough to take the weight off pawl B, which I then give a reverse movement by means of a rope attached so as to pull it back. This allows the gate to drop to the ground and takes all the weight off the post and hinges.

I claim as my invention—

The combination with a gate having its upright and horizontal members pivoted together, of the block A, and pawl B, arranged and combined to operate substantially as set forth.

Signed at Lamoni, Iowa, this 21st day of February, 1896.

BURTON PHILIP STEDMAN.

Witnesses:
W. T. COONS,
GUSTAV SAGE.